Aug. 11, 1970  H. LEIBER  3,523,712

VEHICLE BRAKE CONTROL SYSTEM FOR PREVENTING WHEEL LOCKING

Filed Nov. 15, 1967  2 Sheets-Sheet 1

INVENTOR.
Heinz Leiber
BY Spencer & Kaye
ATTORNEYS

3,523,712
VEHICLE BRAKE CONTROL SYSTEM FOR PREVENTING WHEEL LOCKING
Heinz Leiber, Leimen, Germany, assignor to Teldix G.m.b.H., Heidelberg-Wieblingen, Germany
Filed Nov. 15, 1967, Ser. No. 683,236
Claims priority, application Germany, Nov. 16, 1966
T 32,527
Int. Cl. B60t 8/16
U.S. Cl. 303—21    8 Claims

ABSTRACT OF THE DISCLOSURE

A brake control system for wheeled vehicles that have means for applying a braking force to a wheel to prevent the wheel from locking when such force is applied. The control system, which includes means for reducing the instantaneous braking force when the wheel decelerates in excess of a certain threshold value, provides a functional relationship between the rotational speed of the wheel and this deceleration threshold value. In general, the higher the rotational speed, the greater the threshold value.

BACKGROUND OF THE INVENTION

The present invention relates to an anti-wheel-locking control system for motor vehicles; more particularly, to a motor vehicle braking system which measures the rotational deceleration of a wheel and produces a control signal which orders the reduction of the braking force if the rotational deceleration exceeds a certain threshold value.

Vehicle brake systems for preventing wheel locking are known in the art and are based on the fact that a vehicle exclusively braked with the aid of friction brakes and its own weight can attain, at most, a longitudinal deceleration of $-b = g \cdot \mu$ where $g$ is the acceleration due to gravity and $\mu$, which has been empirically determined to be $\leq 1$, is the coefficient of friction between tires and road. To the extent of this relation, a motor vehicle is indistinguishable from a body without wheels which slide on its supporting surface. If, therefore, the rotational deceleration of a wheel, as measured tangential to the tire circumference, increases to a value higher than the deceleration $-b = g \cdot \mu$, it may be assumed that the wheel will lock. The prior art anti-locking control systems have consequently reduced the brake pressure, and thus the braking force, in response to a threshold or "actuating value" of the wheel's rotational deceleration which corresponds to a tire tangential deceleration approximately in the range of 1.2 to $2.0 \cdot g$.

In order to provide passenger vehicles with the means to achieve the shortest possible stopping distance it is desirable to improve such anti-locking brake control systems. Attempts at improvements, however, are met with a number of problems, one of which is set forth below.

Motor vehicle roadways frequently include short, uneven sections, such as expansion joints on cement highways, as well as slippery portions, such as oil spots or sections of ice or snow covering the pavement, if, for example, a vehicle without an anti-locking brake control system were to drive over and brake on a short slippery section (e.g., 20 cm. long), so fast (e.g., over 50 miles an hour) that the angular momentum of the wheel passing over this spot would maintain some wheel rotation during the short time when the road friction dropped, the wheel in question would suddenly decelerate and then accelerate again, without locking, without any special deleterious effects. If, however, a brake control system were present, the control system would react to the spike in the rotational deceleration and reduce the braking pressure, although this, under the particular circumstances, would not be necessary at all.

Especially if the brake control system were designed to maintain the brake pressure at the reduced level for a predetermined interval or to permit the pressure to increase only showly after actuation, the occurrence described above could theoretically result in a greater stopping distance than would be possible with the uncontrolled brake system.

SUMMARY OF THE INVENTION

An object of the present invention, therefore, is to eliminate the above-described disadvantage of the anti-wheel-locking brake control systems of the prior art.

This as well as other objects which will become apparent in the discussion that follows are achieved, according to the present invention, by establishing a functional relationship between the actuating value of rotational deceleration of the switching apparatus and the rotational speed of the respective wheel so that increased rotational speeds are met with increased deceleration actuating values. This relationship insures that, for any given speed, the actuating value of rotational deceleration will be high enough to prevent the rotational deceleration sensor from actuating when the roadway is uneven or has isolated slippery surfaces.

An additional advantageous result of making the actuating value dependent upon the rotational speed lies in the avoidance of periodic oscillations of the brake control system which, under certain conditions, could produce dangerous mechanical oscillations in the vehicle chassis. Such periodic oscillations are especially likely to occur when the pavement has a number of successive bumps or buckles at approximately regularly spaced intervals. When, with increasing rotational speed, the rotational deceleration actuating value is made higher, there is an increase in the length of time between the instant the value of wheel deceleration begins sharply to increase and the instant the braking force is reduced. This additional delay, when incorporated in the regulating cycle, increases the period of the cycle making it actually longer than what it would be at lower rotational speeds. It therefore becomes effectively impossible to obtain a regulating frequency sufficiently higher to produce resonance in a chassis.

The realization of the functional relationship, according to the present invention, may be accomplished, first, with the aid of electronic means; such means are especially practical when the measurement of rotational deceleration has been made electrically. It is known in the art, for example, to mechanically connect a D.C. generator with the wheel to be braked so that the rotational speed of the wheel is converted to a representative voltage. The prior art also contemplates connecting a differentiating RC-series circuit to the output of the generator and connecting the voltage appearing across the resistor, which represents the deceleration, to an electrical relay or to one or more solenoid valves. The rotational deceleration actuating value in such a system is thus determined by the voltage necessary to actuate the relay of the solenoid valves; this voltage which is a constant, occurs or is exceeded only when the generator is decelerated faster than a given rate.

If, now, a variable gain amplifier is connected in the circuit between the resistor and the relay, or the relay is replaced by a Schmitt Trigger circuit having a variable voltage threshold, the amplification factor or the voltage threshold, respectively, can be made dependent on the voltage appearing at the generator terminals. The desired functional relationship is thus achieved by reducing the gain with increasing generator voltage or increasing the threshold voltage.

It is particularly advantageous to realize the present invention using mechanical means. This may be accomplished by a system having an electrical switch which is actuated by the relative angular displacement between a shaft mechanically connected to the wheel to be braked and a flywheel arranged coaxially to and elastically coupled with the shaft. It is proposed to provide at least one mass which is subjected to rotational movement about the common shaft axis and so pivoted and situated that its center of gravity can move outward from the axis under the influence of centrifugal force. This centrifugal force can then be deflected so as to operate against the relative angular displacement that actuates the switch. This mass could, as an example, be a simple lever having two arms arranged at an angle with respect to each other and rotatably mounted on the shaft out of balance with respect to its own axis and arranged so that one arm extends approximately radially outward from the shaft to engage either the flywheel or a neighboring lever.

Figure 1:
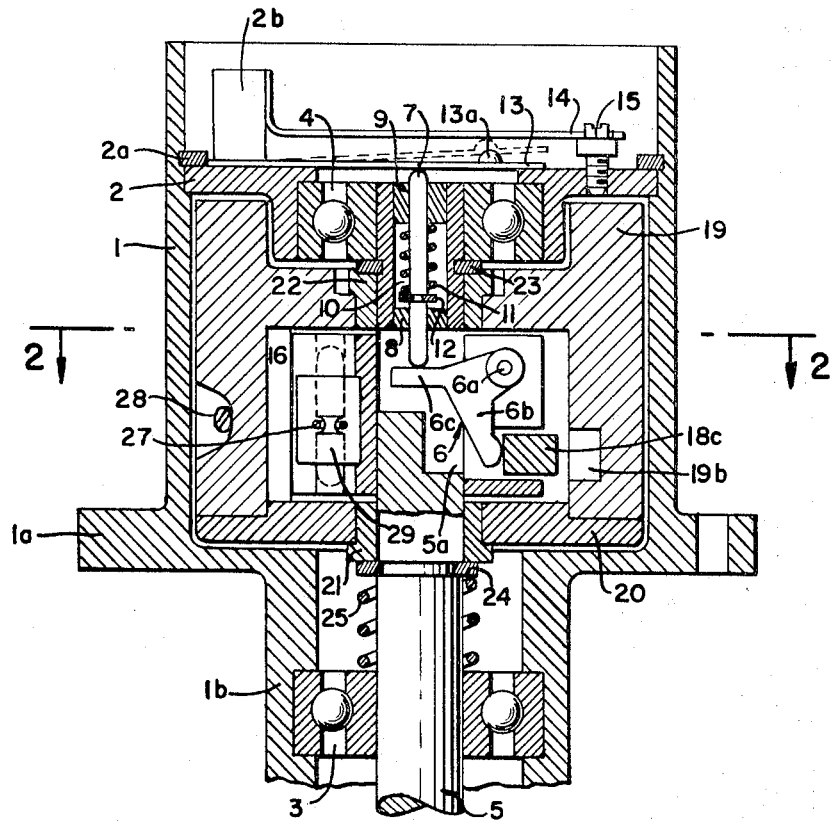
FIG. 1 is a longitudinal cross-section of a mechanical embodiment of a rotational deceleration sensor according to the present invention.
Figure 2:
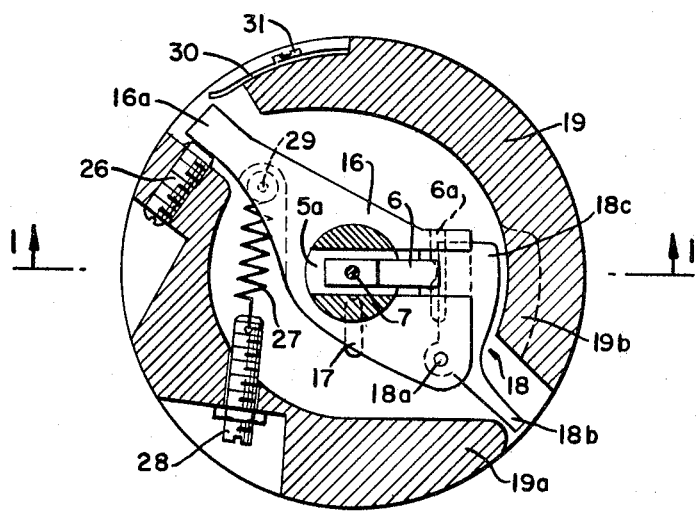
FIG. 2 is a transverse cross-section of the rotational deceleration sensor taken along the line II—II of FIG. 1.

Referring now to the drawings, FIGS. 1 and 2 taken together illustrate, in cross-section, one embodiment of the rotational deceleration sensor according to the present invention. This mechanical sensor includes a housing 1 which may, for example, be attached to the brake support plate of a vehicle by means of a flange 1a. An intermediate shaft 5 is rotatably fixed by means of two ball bearings 3 and 4 within a tubular extension 1b and an intermediate wall 2, respectively. The intermediate wall 2 is maintained in the inserted position by means of a spring ring 2a. The intermediate shaft is driven by the wheel to be braked, not shown.

An adapter 16 is mounted on the shaft 5 inside the housing and approximately half-way between the ends of the shaft 5 shown in FIG. 1. This adapter is fastened to the shaft by means of a transverse pin 17, as shown in FIG. 2. The adapter serves to hold a shift lever 6 with the aid of another pin 6a that is located at a distance and perpendicular to the axis of the shaft 5. The shift lever 6 has an arm 6c directed radially inward and another arm 6b running in the direction of the shaft axis. The end of the arm 6b is provided with a crown.

A second shift lever 18, which is best illustrated in FIG. 2, is mounted with a fastening pin 18a that runs parallel to the shaft axis. This lever has an arm 18b which is directed radially outward from the shaft axis and a second considerably thicker arm 18c, shown in cross section in FIG. 1, which contacts the arm 6b of the shift lever 6.

The shaft 5 is slotted in the region of the adapter 16. The shift lever 6 and a push rod 7 project into this slot 5a. Two bearing bushings 8 and 9, which are inserted in a centered hole 10 in the shaft 5 running from the face of the end of the shaft to the slot 5a, hold the push rod at the axis of the shaft 5 and permit the push rod to slide in the longitudinal direction. Between the bearing bushing 9 and a retaining ring 12 is a pressure spring 11 which is tensioned to hold one end of the push rod in contact with the arm 6c of the shift lever 6. If the lever 6, as shown in FIG. 1, is turned toward the right, the push rod 7 lifts a flat spring 13 to the position shown by the dashed lines and, therefore, brings a contact bead 13a in contact with a second flat spring 14. The flat spring 13 is directly mounted on the intermediate wall 2; the flat spring 14 is mounted on this wall by means of an insulating member 2b. The position of the flat spring 14 can be adjusted by means of a set screw 15.

The actual rotating mass 19 or "flywheel" has a form similar to that of a cup and, together with a cover 20, surrounds the adapter 16 and the two shift levers 6 and 18. The flywheel is rotatably mounted on the shaft 5 with sleeve bearings 21 and 22; longitudinal displacement along the shaft is prevented by retaining rings 23 and 24. A pressure spring 25, located between the retaining ring 24 and the ball bearing 3, is provided, in addition, to prevent the shaft from moving in its axial direction with respect to the housing 1. A recess 19b in the flywheel serves to make assembly easier and to insure freedom of movement of the shift lever 18.

One finger 16a of the adapter 16 is normally held by means of a spring 27 against a stop screw 26 inserted through the flywheel. One end of the spring 27 is fastened to the flywheel by means of a tensioning screw 28; the other end of the spring grips a pin 29 in the adapter. A flat spring 30, which is fastened to the flywheel by means of a screw 31, is provided to damp any possible angular oscillations of the flywheel.

The positions of the movable parts illustrated in FIGS. 1 and 2 represent the positions of these parts when the vehicle is driven unbraked or is at a standstill. The spring 11 presses the push rod against the lever arm 6c, the lever arm 6b against the lever arm 18c and the lever arm 18b against portion 19a of the flywheel. The contact springs 13 and 14 do not touch. It is assumed that when the vehicle drives forward, the shaft, the adapter and the flywheel shown in FIG. 2 turn toward the left. If now the vehicle is braked, producing a rotational deceleration, the flywheel will tend to turn relative to the adapted against the force of the springs 27 and 11. This will cause the lever 18 to swivel toward the left (FIG. 2) and the lever 6 toward the right (FIG. 1). This movement of the lever works against the centrifugal force which—as may be easily seen in FIGS. 1 and 2—tends to turn the lever 18 towards the right and the ever 6 towards the left. There will thus be a torque applied to the flywheel which is dependent on the centrifugal force and which opposes the moment of inertia that is dependent upon the rotational deceleration. Relative rotation can, therefore, only occur when the moment originating from the rotational deceleration is predominant. When this is the case, the push rod 7 will raise the flat spring 13 and close the contact.

Figure 3:
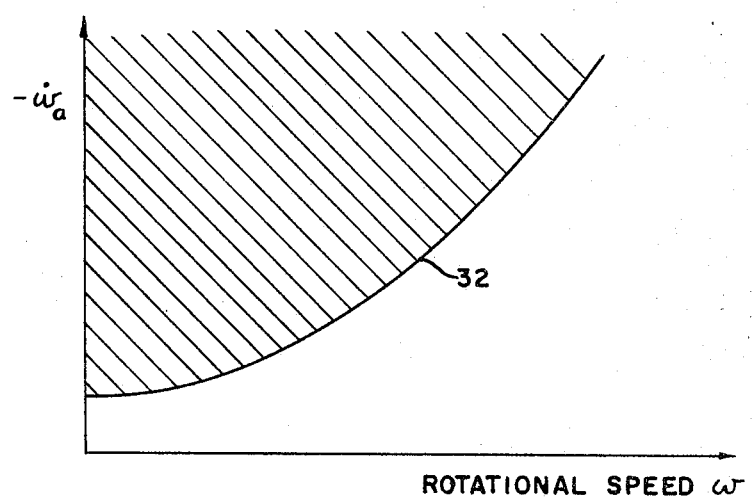
FIG. 3 is a graph of the functional relationship between the rotational deceleration actuating value and the rotational speed of the rotational deceleration sensor embodiment of FIGS. 1 and 2.

The curve 32 in FIG. 3 shows the dependence of the actuating value of rotational deceleration $$(-\dot{\omega}_a)$$

upon the rotational speed ($\omega$) of the shaft 5 for the device shown in FIGS. 1 and 2. Curve 32 represents the balance of the moments of the flywheel 19 which is physically equivalent with the actuating value of rotational deceleration. If, for example, this balance of moments is present and the deceleration is increased only slightly, the flywheel will turn with respect to the adapter and close the contact.

The shaded area lying over the curve 32 corresponds to the situation where the contact is closed; the area under the curve corresponds to the situation where the contact is open.

The shape and position of the curve 32 results from the addition of the moments caused by the springs 27 and 11, which are independent of the rotational speed, with the individual moments operating in the same direction which originate in the centrifugal force of the lever arms 6b and 18c. In the first approximation these individual moments increase quadratically with the rotational speed since the centrifugal force is quadratically dependent upon the rotational speed. The scale factor can be selected to meet the requirements of the brake control system by choice of the amount of unbalance of the two levers.

Figure 4:
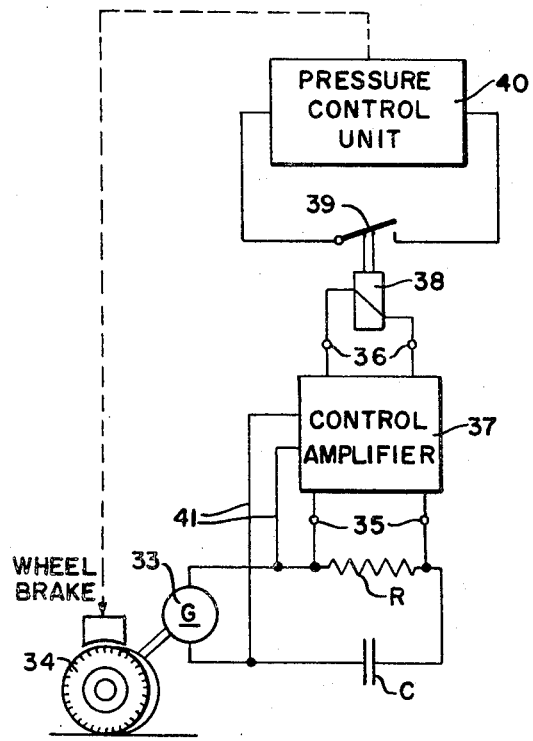
FIG. 4 is a schematic diagram of an electrical embodiment of a brake control system for preventing wheel locking according to the present invention.
Figure 5:
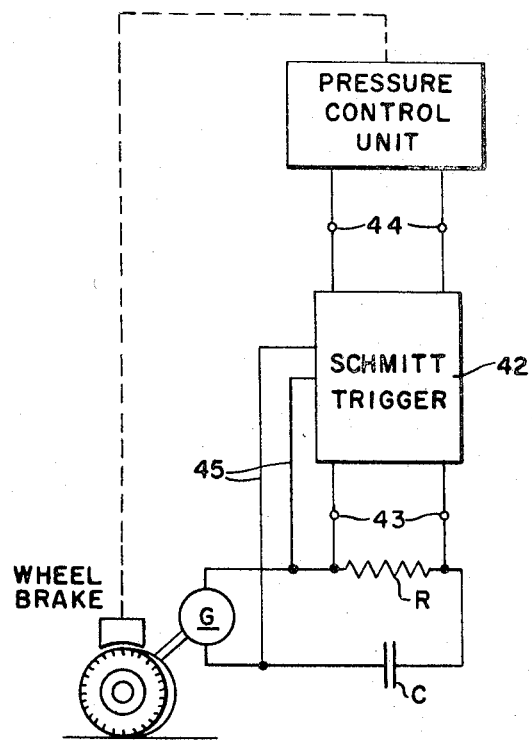
FIG. 5 is a schematic diagram of another electrical embodiment of a brake control system for preventing wheel locking according to the present invention.

FIG. 4 shows an anti-wheel-locking control system with a control amplifier having a variable gain factor. It comprises a D.C. generator 33, driven by a vehicle wheel 34, which feeds a circuit including a resistor R and a capacitor C connected in series. The voltage drop across the resistor R is fed to the input terminals 35 of a control amplifier 37. The output terminals 36 of this amplifier are connected with a relay 38, the contact 39 of which switches a brake pressure control unit 40. This pressure control unit, only schematically shown in FIGS. 4 and 5, is known in the art and requires no further discussion here; contemplated chiefly is a system of the type having electromagnetically controlled valves that control the air or hydraulic pressure fed to the wheel brake or brakes.

The relay 38 switches as soon as a minimum voltage drop occurs across resistor R. Since this voltage drop is the differentiation with respect to time of a voltage approximately linearly dependent on the rotational speed of the wheel, it represents the threshold value of rotational deceleration.

Now, according to the present invention, the control amplifier 37 is constructed so that its gain factor may be varied in dependence upon the voltage dependent on rotational speed; that is, the instantaneous voltage appearing at the output terminals of the generator. To this end, another input to the amplifier is connected, by means of conductors 41, with the outputs of the generator. The amplifier is designed so that the gain factor is reduced with increasing rotational speed. Thus, with increased speeds a correspondingly greater rotational deceleration is required to close the contact 39 of the relay 38. This electrical embodiment of the present invention, illustrated in FIG. 4, is advantageous since it makes possible a still greater flexibility in the selection of a suitable actuating value curve.

The gain factor of the amplifier 37 is controlled in a manner well known in the art.

A circuit suitable for this purpose is shown and described in "Technische Informationen für die Industrie, No. 95," published by Valvo GmbH., Burchardstrasse 19, Hamburg, in December 1966. See pages 19 to 22.

FIG. 5 shows also a D.C. generator, mechanically connected to a vehicle wheel and electrically connected with a series RC circuit, as well as a pressure control unit as discussed in connection with FIG. 4. Instead of the amplifier and the relay, however, an electronic switch 42, of the type known in the art as a "Schmitt Trigger," is here provided with its output terminals 44 connected directly to the pressure control unit.

The output terminals of the switch 42 take on only two states: "Voltage" and "No Voltage." If a voltage is present, it is always sufficient to control the solenoid valves, relays, transistors, etc. of the pressure-control unit connected to the output terminals 44. The "Voltage" condition occurs when a voltage is present at the input terminals 43 that is equal to or greater than a certain threshold voltage. The value of this threshold voltage, required to switch the Schmitt Trigger 42, is varied by a control voltage fed to a second input. In the manner described for the circuit of FIG. 4 this second input is connected with the generator output terminals by means of conductors 45. The Schmitt Trigger is designed so that its threshold voltage increases when the voltage applied to this second input increases; that is, when the rotational speed of the wheel increases.

An amplifier suitable as a variable threshold Schmitt Trigger for use in this circuit is shown in a data sheet "A 710—High-Speed, Differential Comparator," published 1965 by SGS Fairchild.

It will be understood that the above description of the present invention is susceptible to various modifications, changes, and adaptations, and the same are intended to be comprehended within the meaning and range of equivalents of the appended claims.

I claim:

1. In a brake system for use with wheeled vehicles and including means for applying a braking force to a wheel and brake control means for preventing wheel locking when such brake force is applied, the improvement wherein said brake control means comprises, in combination:
    (a) first means for sensing the rotational speed of a wheel;
    (b) second means for sensing the rotational deceleration of such wheel;
    (c) third means connected to said first means and to said second means including
        (1) means connected to said second means for producing an output for causing the instantaneous effective braking force to be reduced whenever the value of rotational deceleration sensed by said second means exceeds a given threshold, and
        (2) means connected to said first means and to said output producing means for varying said threshold such that said threshold increases when the value of rotational speed increases and said threshold decreases when the value of rotational speed decreases.

2. The improvement defined in claim 1, wherein said output producing means includes an electrical switch.

3. The improvement defined in claim 2, further comprising a rotatable shaft mechanically driven by such wheel and flywheel means arranged coaxially with said shaft, and wherein said means for producing an output includes means for operating said electrical switch responsive to the relative angular displacement of said shaft and said flywheel, and said deceleration threshold varying means includes (1) at least one mass arranged to rotate about the common axis of said shaft and said flywheel and arranged so that its center of gravity applies a force outward, away from said axis, under the influence of centrifugal force and (2) force deflecting means operative to oppose said relative angular displacement in response to said outward force.

4. A brake control system, as defined in claim 3, wherein said mass includes at least one first lever having two arms arranged at an angle with respect to each other, said lever being rotatably connected to said shaft in such a manner that it is out of balance with respect to its axis of rotation, said lever having one arm extending approximately radially outward from said axis of rotation pressing against said deflecting means.

5. A brake control system as defined in claim 4, wherein said flywheel constitutes said deflecting means.

6. A brake control system as defined in claim 5, wherein said deflecting means comprises a second lever.

7. A brake control system as defined in claim 1, wherein said first means includes means for producing an electrical signal proportional to said rotational speed of said wheel, said second means includes means for differentiating said electrical signal and producing an electrical signal proportional to the result of said differentiation.

8. A brake control system as defined in claim 7, wherein said third means includes an amplifier, the gain of which decreases when said signal proportional to said rotational speed increases and which increases when said signal proportional to said rotational speed decreases.

References Cited

UNITED STATES PATENTS

| | | |
|---|---|---|
| 3,017,145 | 1/1962 | Yarber. |
| 3,260,555 | 7/1966 | Packer. |
| 3,352,388 | 11/1967 | Leiber. |
| 3,398,995 | 8/1968 | Martin. |

DUANE A. REGER, Primary Examiner

U.S. Cl. X.R.

188—181